(12) United States Patent
Bansal et al.

(10) Patent No.: US 8,234,494 B1
(45) Date of Patent: Jul. 31, 2012

(54) SPEAKER-VERIFICATION DIGITAL SIGNATURES

(75) Inventors: Pradeep K. Bansal, Monmouth Junction, NJ (US); Lee Begeja, Gillette, NJ (US); Carroll W. Creswell, Basking Ridge, NJ (US); Jeffrey Farah, North Brunswick, NJ (US); Benjamin J. Stern, Morris Township, Morris County, NJ (US); Jay Wilpon, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1127 days.

(21) Appl. No.: 11/312,403

(22) Filed: Dec. 21, 2005

(51) Int. Cl.
H04L 29/06 (2006.01)
(52) U.S. Cl. ......................................................... 713/176
(58) Field of Classification Search .................... 713/176
See application file for complete search history.

(56) References Cited

U.S. PATENT DOCUMENTS

| | | | | |
|---|---|---|---|---|
| 5,613,012 A | * | 3/1997 | Hoffman et al. | 382/115 |
| 6,157,707 A | * | 12/2000 | Baulier et al. | 379/189 |
| 6,370,506 B1 | * | 4/2002 | Ahluwalia | 704/275 |
| 6,654,373 B1 | * | 11/2003 | Maher, III | 370/392 |
| 7,797,543 B1 | * | 9/2010 | Campbell et al. | 713/178 |
| 2001/0034836 A1 | * | 10/2001 | Matsumoto et al. | 713/176 |
| 2003/0135740 A1 | * | 7/2003 | Talmor et al. | 713/186 |
| 2004/0153655 A1 | * | 8/2004 | Rolfe | 713/185 |
| 2005/0015596 A1 | * | 1/2005 | Bowers | 713/170 |
| 2005/0188026 A1 | * | 8/2005 | Hilbert et al. | 709/206 |

OTHER PUBLICATIONS

Larry P. Heck, "On the Deployment of Speaker Recognition for Commercial Applications: Issues & Best Practices", International Biometrics Consortium, Sep. 23, 2003.
U.S. Appl. No. 11/274,266, Nov. 16, 2005.
U.S. Appl. No. 11/248,211, Oct. 13, 2005.

* cited by examiner

Primary Examiner — Michael S McNally (57) ABSTRACT

A speaker-verification digital signature system is disclosed that provides greater confidence in communications having digital signatures because a signing party may be prompted to speak a text-phrase that may be different for each digital signature, thus making it difficult for anyone other than the legitimate signing party to provide a valid signature.

16 Claims, 8 Drawing Sheets

| Identification | Voiceprint | Date Recorded | Weights | Text-Phrase Log | History Data |
|---|---|---|---|---|---|
| Ben | Pointer 1 | December 25, 2005 | Pointer 1a | Pointer 1b | Pointer 1c |
| Carroll | Pointer 2 | January 1, 2006 | Pointer 2a | Pointer 2b | Pointer 2c |
| Jay | Pointer 3 | February 2, 2008 | Pointer 3a | Pointer 3b | Pointer 3c |
| Jeff | Pointer 4 | March 15, 2008 | Pointer 4a | Pointer 4b | Pointer 4c |
| Lee | Pointer 5 | May 31, 2009 | Pointer 5a | Pointer 5b | Pointer 5c |
| Pradeep | Pointer 6 | November 23, 2007 | Pointer 6a | Pointer 6b | Pointer 6c |

SPEAKER-VERIFICATION DIGITAL SIGNATURES

BACKGROUND

Using digital signatures is a convenient method for providing authentication in digital communications. Thus, new technology is needed to provide greater confidence in digital signatures.

SUMMARY

A speaker-verification digital signature system is disclosed that provides greater confidence in communications having digital signatures because a signing party may be prompted to speak a text-phrase that may be different for each digital signature, thus making it difficult for anyone other than the legitimate signing party to provide a valid signature. For example, the text-phrase may be a set of words taken from a communication being transmitted by the signing party or generated spontaneously from a large corpus of text-phrases.

For example, when a party desires to provide a speaker-verification digital signature for an email, the email may be sent to an authentication service that prompts the party to speak a text-phrase generated by the authentication service. When the party's speech is received, the authentication service may confirm the party's identity by comparing the speech against the text-phrase using speaker-independent speech-recognition. Additionally, the audio signal of the party's speech may be processed to extract features and compared against one or more voice-templates that were previously trained by the party. If both of the above tests exceed appropriate thresholds, then the authentication service may transmit a speaker-verification digital signature associated with the email to recipients of the email for confirmation of the party's authentication.

The authentication service may provide a registration procedure for interested parties to register voice-templates for generating speaker-verification digital signatures. For example, the authentication service may provide a voice-template training process so that the interested parties may establish their identity by generating their voice-templates to be stored in a secured repository for use by the authentication service to generate speaker-verification digital signatures. Alternatively, voice-templates may be generated elsewhere such as by interested parties' end-user systems and the voice-templates provided to the authentication service to be stored in the repository.

Voice-templates may be one or more patterns, models, etc. Voice-templates may be generated by requesting a party to speak one or more text-phrases. Audio signals corresponding to the party's speech may be processed to extract voice features that may be used to generate a voice-template for text-independent speaker-verification. While speaker-independent speech-recognition may be used to decode the spoken words, voice-templates for a registered party may also be used to enhance speech-recognition. In this way, the authentication service may provide speaker-verification digital signatures for recipients of digital communications from a registered party to authenticate the identity of the registered party as the source of the digital communication.

BRIEF DESCRIPTION OF THE DRAWINGS

The invention is described in detail with reference to the following figures, wherein like numerals reference like elements, and wherein.

DETAILED DESCRIPTION OF EMBODIMENTS

Figure 1:
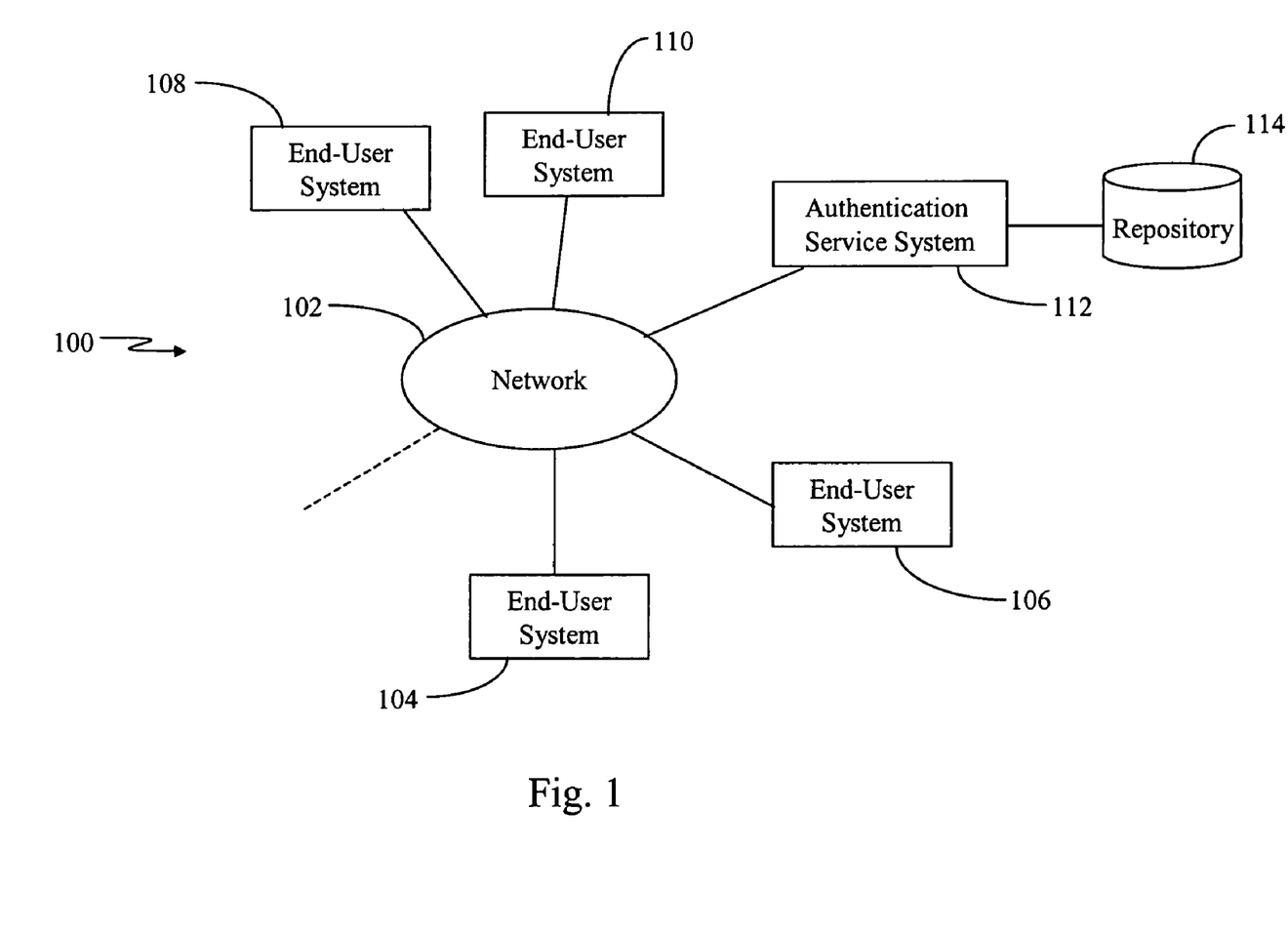
FIG. 1 shows an exemplary speaker-verification digital signature system.

FIG. 1 shows an exemplary diagram of a speaker-verification digital signature system 100 that includes end-users systems 104-110, authentication service system 112 and repository 114. All of these components may be coupled together via network 102. Network 102 may be any combination of networks such as the Internet, local area networks (LANs), wide area networks (WANs), wireless, wired, and/or optical networks, etc.

End-users using end-user systems 104-110 may communicate with each other by sending email, facsimile, etc. When it is desire to provide authentication of the source of a digital communication such as for a business contract, for example, the end-users may wish to provide speaker-verification digital signatures in connection with the digital communication so that receiving parties may have confidence that the source of the received digital communication is as claimed in the digital communication.

When an end-user using end-user system 104 communicates with end-users of end-user systems 106-110 via email and desires to provide a speaker-verification digital signature, a request may be sent to authentication service system 112. When the request is received, authentication service system 112 may generate a text-phrase and send the text-phrase to end-user system 104 which may prompt the end-user to speak the text-phrase to generate an audio signal. The audio signal may be sent to authentication service system 112, along with the destination addresses from the email. The email may be sent to the destination addresses either independently of the authentication service system 112 or by the authentication service system 112. If the email is sent independently of the authentication service system 112, end-user system 104 must first add a session Identification (ID) to the email before sending. The speaker-verification digital signature sent to the destination addresses by authentication service system 112 will also be identified by the same session ID. The session ID may be generated so that it is unique for each destination address, unique for each requesting party, and/or unique for each communication. Separately sending the email and the speaker-verification digital signature may provide another added level of security since it would be more difficult to spoof the speaker-verification digital signature by capturing both the email and the speaker-verification digital signature and resending with tampered data.

When the audio signal is received, authentication service system 112 may perform a speaker-independent speech recognition process on the received audio signal and compare decoded words from the audio signal against the prompted text-phrase. One or more voice-templates may be retrieved from repository 114 that corresponds to an identity claimed in the email (e.g., the "from" field in the email), and features extracted from the received audio signal may be compared against the retrieved one or more voice-templates to determine authenticity of the identity that is claimed to be the source of the email.

The speaker-independent speech-recognition comparison makes it difficult for an impostor to use a recording of a person's voice to impersonate that person as a sender of the email, while the speaker-verification comparison positively identifies the identify of the speaking party. If results of the these comparisons exceed one or more appropriate thresholds, then a match may be achieved, and authentication service system 112 may issue a speaker-verification digital signature that authenticates the claimed source.

For example, authentication service system 112 may send the session ID to end-user system 104 that is added to the email, and generate a speaker-verification digital signature in the form of authentication information such as the session ID packaged with either a certificate of authentication confirming the claimed party as the source, or the comparison results in terms of a confidence level if the one or more appropriate thresholds were not exceeded. This authentication information may be sent to the one or more destination addresses identified in the email (e.g., the "To" list) such as one or more end-user systems 106-110.

When the speaker-verification digital signature and the email both arrive at the destinations, end-user systems 106-110 may save the speaker-verification digital signature until the receiving party opens the email. When the email is opened, end-user system 106-110 may display the authentication information based on the speaker-verification digital signature having the same session ID as in the email so that the receiving party may assess the authenticity of the email.

Figure 2:
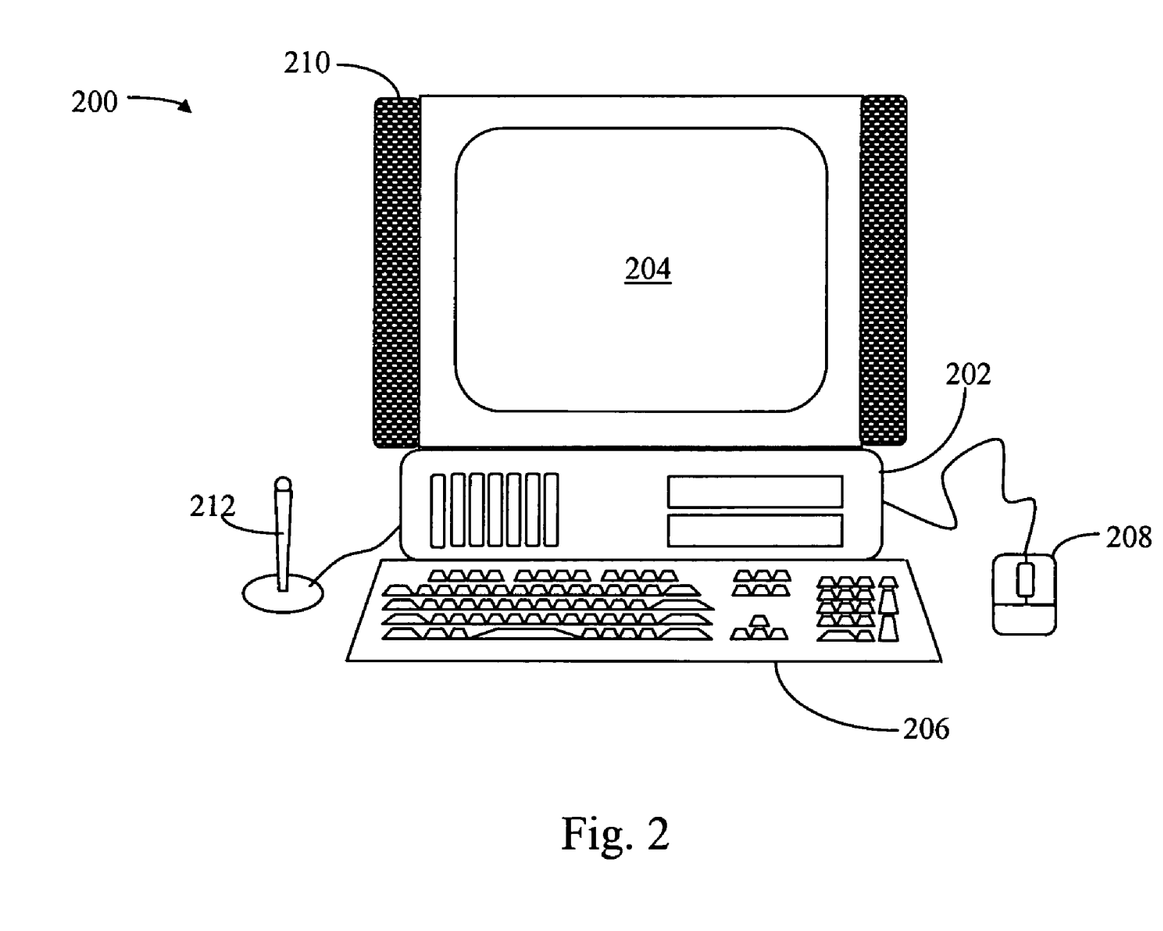
FIG. 2 shows an exemplary end user system shown in FIG. 1.

FIG. 2 shows an exemplary end-user system 200 that may include a controller 202 such as a personal computer processor which may execute software to perform the processes discussed below, a display 204, a keyboard 206, a mouse 208, speakers 210 and a microphone 212, for example. An end-user may use end-user system 200 to compose a digital communications such as email, facsimile, file transfers, etc., for example. If a speaker-verification digital signature is desired for authentication, a request for generating the speaker-verification digital signature may be transmitted to authentication service system 112 via a network interface (not shown) of end-user system 200. When received, authentication service system 112 may send a text-phrase to end-user system 200. End-user system 200, may display the text-phrase on display 204 together with a prompt for the end-user to speak the text-phrase into microphone 212 to generate an audio signal. When the audio signal is received, controller 202 may transmit the audio signal to authentication service system 112 for confirming authenticity of the speech of the sender and generating the speaker-verification digital signature.

Figure 3:
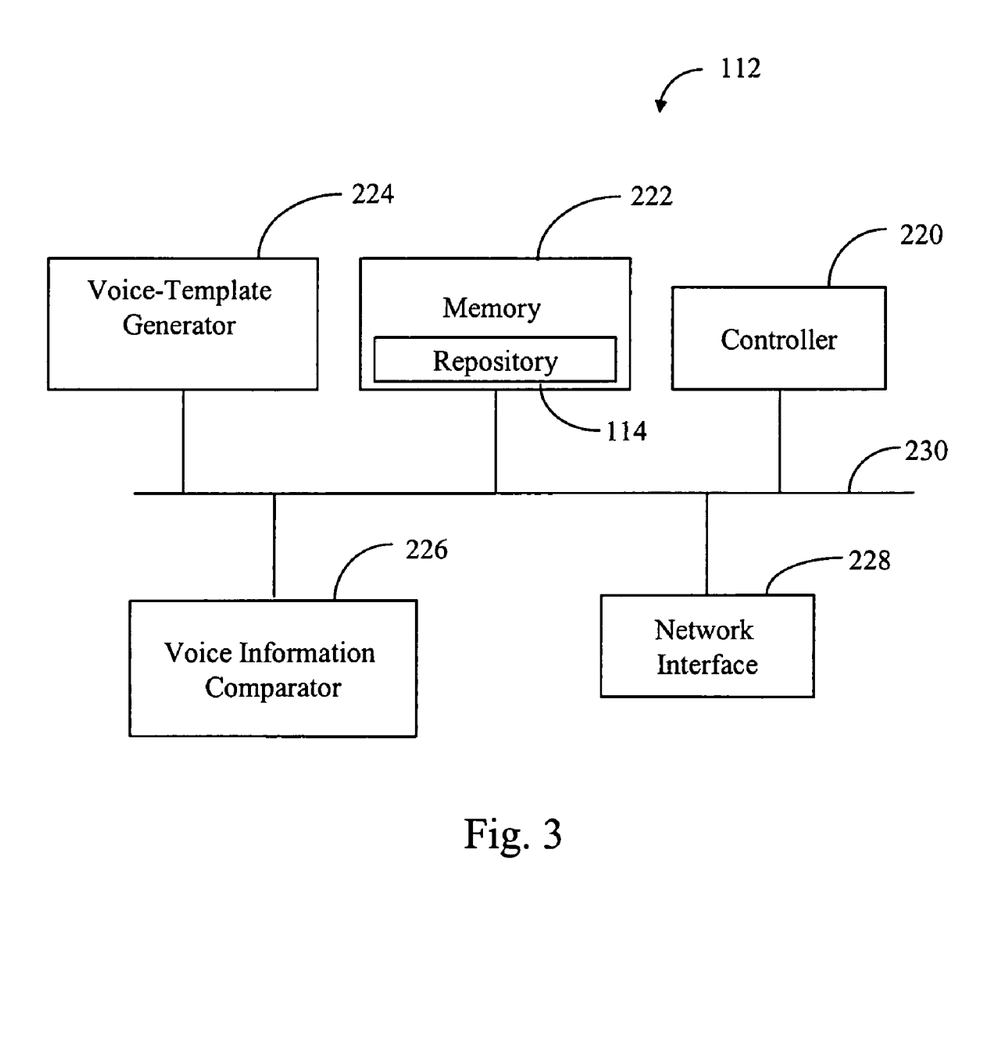
FIG. 3 shows an exemplary block diagram of an authentication service system.

FIG. 3 shows an exemplary block diagram of authentication service system 112 that may include a controller 220, a memory 222, a voice-template generator 224, a voice information comparator 226 and a network interface 228. The above components may be coupled together via bus 230. Although FIG. 3 shows repository 114 stored in memory 222, as an example, repository 114 may be stored elsewhere and authentication service system 112 may access repository 114 via network interface 228, for example. Memory 222 may comprise one or more mass storage devices such as ROM, RAM, optical disk(s), hard disk(s), etc.

While FIG. 3 shows authentication service system 112 using a bus architecture, any type of hardware architecture, including wire, wireless and/or optical networks may be used based on implementation details. Components 222-228 may be connected to controller 220 via any number of methods including being connected via IO ports of controller 220, via serial IO interface, via parallel high-speed backplane interface, etc., for example. Components 220-228 may be implemented using any available hardware technology such as FPGA, PAL, application-specific integrated circuits (ASICs), etc. Additionally, all of the functions performed by authentication service system 112 may be implemented partly or completely in software as programs executing on a general purpose or special purpose computer.

When a request for speaker-verification digital signature is received via network interface 228, controller 220 may generate a session ID and send the session ID to the requesting end-user system for inserting into a digital communication associated with the request. As noted above, the session ID may be unique in many different senses. For example, the session ID may be unique for each communication. However, is a number of session IDs becomes too large, the session IDs may be unique for different communications of the same party but may be the same as that of other parties, for example. If authentication service system 112 is sending the digital communication, the controller 220 inserts the session ID into the communication.

Controller 220 may generate a text-phrase that would make it difficult to predict the contents of the text-phrase. For example, the text-phrase may be generated from a large corpus of phrases, a source of random words, or spontaneously from a prior communication, for example. The generated text-phrase which may include one or more words may be saved for each party requesting speaker-verification digital signature for later use or for guaranteeing that the phrases are not used again. The generated text-phrases may be deleted instead of being saved in repository 114 to avoid copying by imposters.

Controller 220 may transmit the generated text-phrase to end-user system 104-110 that may display the text-phrase and prompt an end-user to speak the text-phrase. The audio signal generated by the end-user speech may be returned to authentication service system 112 via network 102 and network interface 228. As an alternative, the audio signal may be converted into voice features and transmitted to authentication service system 112 to be used in the verification process. When the audio signal is received, controller 220 may command voice information comparator 226 to determine whether words spoken by the end-user match the text-phrase that was transmitted to end-user system 104-110.

Voice information comparator 226 may perform text-independent speaker-verification by first retrieving from repository 114 one or more voice-templates that correspond to an identified party indicated in the request for the speaker-verification digital signature. The comparator may extract features from the received audio signal and comparing the extracted features against the one or more voice templates. If the compare results exceed one or more appropriate thresholds, a text-independent match may be achieved.

Voice information comparator 226 may perform speech-recognition on the received audio signal to extract one or more words spoken by the end-user. The extracted words may be compared, against the text-phrase that was transmitted to end-user system 104-110 to determine whether the audio signal contains the text-phrase and to generate a compare result such as a percentage of match. If the percentage of match exceeds one or more appropriate thresholds, than a match is achieved.

When the results from voice information comparator 226 are generated, controller 220 and may determine whether the identity claimed in the digital communication is authenticated based on a combination of the speech-recognition and the text-independent comparisons. For example, speech characteristics of end-users may vary across a broad range causing variability in the performance of voice recognition and extracted feature comparisons. If a particular end-user has poor pronunciation but easily recognizable voice features, the speaker-verification comparison may produce high confidence results while the speech-recognition comparison may produce low confidence results. Thus, the results of the speaker-verification comparison and the speech-recognition comparison may be individually weighted using different weights for different end-users. Depending on the outcome of the weighted results, controller 220 may determine whether a match is achieved.

If a match is achieved, controller 220 may generate an authentication certificate and package the authentication certificate with the session ID as authentication information and transmit the authentication information to destination addresses indicated in the communication. The communication may be also transmitted either together with the authentication information or separately. If a match is not achieved, the transmitted authentication information may indicated the failure and may provide one or more confidence scores related to the speech-recognition and/or speaker-verification determinations, for example.

If a party desires to register a voice-template, voice-template generator 224 of authentication service system 112 may transmit a text-phrase to the party's end-user system 104-110, which, in turn, may display the text-phrase on a display and prompt the party to speak the text-phrase. Once audio signals of the party's speech are received, the party's end-user system 104-110 may send the audio signal to voice-template generator 224 for generating a voice-template for the party. When received via network interface 228, for example, voice-template generator 224 may proceed with the voice-template generation process if a voice-template is not provided. If additional samples of the party's speech are required, voice-template generator 224 may request the party's end-user system 104-110 to again prompt the party to speak another text-phrase. When the one or more voice-templates are generated, controller 220 may store the voice-templates in repository 114 together with recordation date and time, weights, etc., for example.

Alternatively, the party's end-user system 104-110 may generate one or more voice-templates using a similar process as discussed above and forward the voice-templates to authentication service system 112 for storage in repository 114. The authentication service system 112 may challenge the voice-templates by requesting the party to speak one or more text-phrases, as discussed above. The received audio signals may be matched against the provided voice-templates, and the challenge is successful if a match is achieved. If the challenge is successful, then the voice-templates may be stored in the repository together with the other associated information discussed above.

Figure 4:
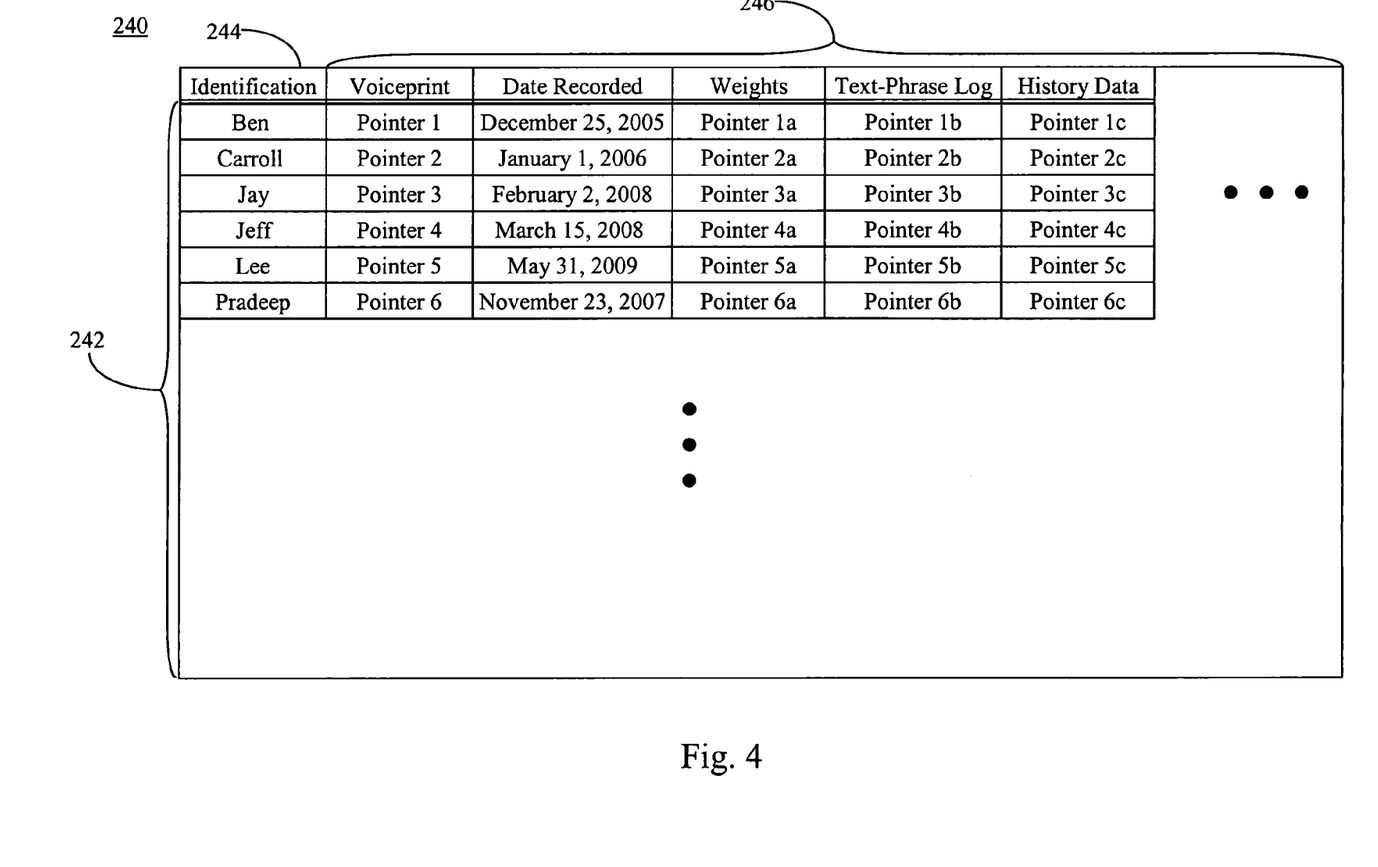
FIG. 4 shows an exemplary data structure of a repository of voice-templates.

FIG. 4 shows an exemplary data structure 240 of repository 114. Data structure 240 may include rows 242 where each row corresponds to a party that has registered one or more voice-templates for generating speaker-verification digital signatures. Column 244 indicates an identification for each of the parties such as a name, for example. Column 246 includes various information types that may be recorded for each of the registered parties. For example, the data stored for each of the parties may be one or more voice-templates, the date that the voice-templates were recorded, various weights that may be used to determine a match of provided one or more audio signals against the voice-templates, a text-phrase log that records the text-phrases that have been used in the past for speaker-verification, historical data regarding any mismatches corresponding to any particular text-phrases, etc. As shown in FIG. 4, pointers may be used for many of the entries so that the data may be stored efficiently in appropriate data structures suitable for each of the data types.

Figure 5:
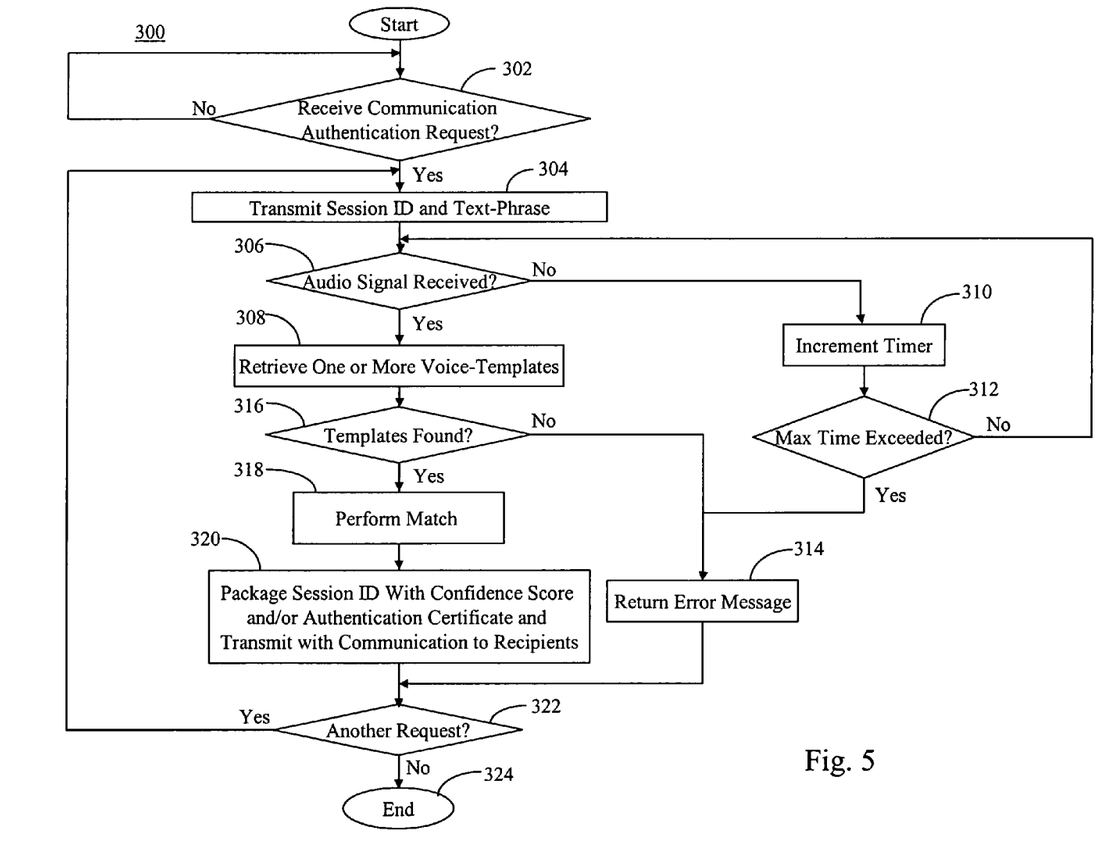
FIG. 5 shows a flowchart of an exemplary authentication service process.

FIG. 5 shows a flowchart of an exemplary process of authentication service system 112. In step 302, the process determines whether a request for speaker-verification digital signature has been received. If a request has been received, the process goes to step 304; otherwise, the process returns to step 302. In step 304, the process generates a session ID, sends the session ID to the requesting end-user system, outputs a text-phrase to the requesting end-user system for displaying to the requesting party and prompting the requesting party to speak the text-phrase, and goes to step 306. In step 306, the process determines whether an audio signal is received. If the audio signal is received, the process goes to step 308; otherwise, the process goes to step 310. In step 310, the process increments a timer and goes to step 312. In step 312, the process determines whether a maximum amount of time has been exceeded. If exceeded, the process goes to step 314; otherwise, the process returns to step 306. In step 314, the process returns an error message to the requesting party indicating that the speaker-verification digital signature was not generated, and the process goes to step 322.

In step 308, the process retrieves from repository 114, for example, one or more voice-templates corresponding to a claimed identity indicated in the communication and goes to step 316. In step 316, the process determines whether the voice-templates are found. If the voice-templates are found, the process goes to step 318; otherwise, the process goes to step 314. In step 318, the process performs speech-recognition and speaker-verification between the received audio signal and the retrieved voice-templates. As discussed above, the speech-recognition performs recognition on the audio signal to determine whether the text-phrase is included in the speech; and the speaker-verification extracts features from the audio signal and compares the features against the retrieved voice-templates to determine a degree of match. The results of the speaker-independent speech-recognition and speaker-verification may be weighted using an appropriate algorithm to determine whether a match has been achieved.

If a match has been achieved, the process may generate an authentication certificate; otherwise, the process may generate a confidence score. After step 318, the process proceeds to step 320. In step 320, the process packages the session ID with either the confidence score and/or the authorization certificate as authentication information and transmits the authentication information (and the communication if requesting party requested the communication to be transmitted together with the authentication information) to recipients indicated in the original request. For example, if the communication is an email, the recipients may be indicated in the "To" list of the email. After step 320, the process goes to step 322. In step 322, the process determines whether another request has been received. If another request has been received, the process returns to step 304; otherwise, the process goes to step 324 and ends.

Figure 6:
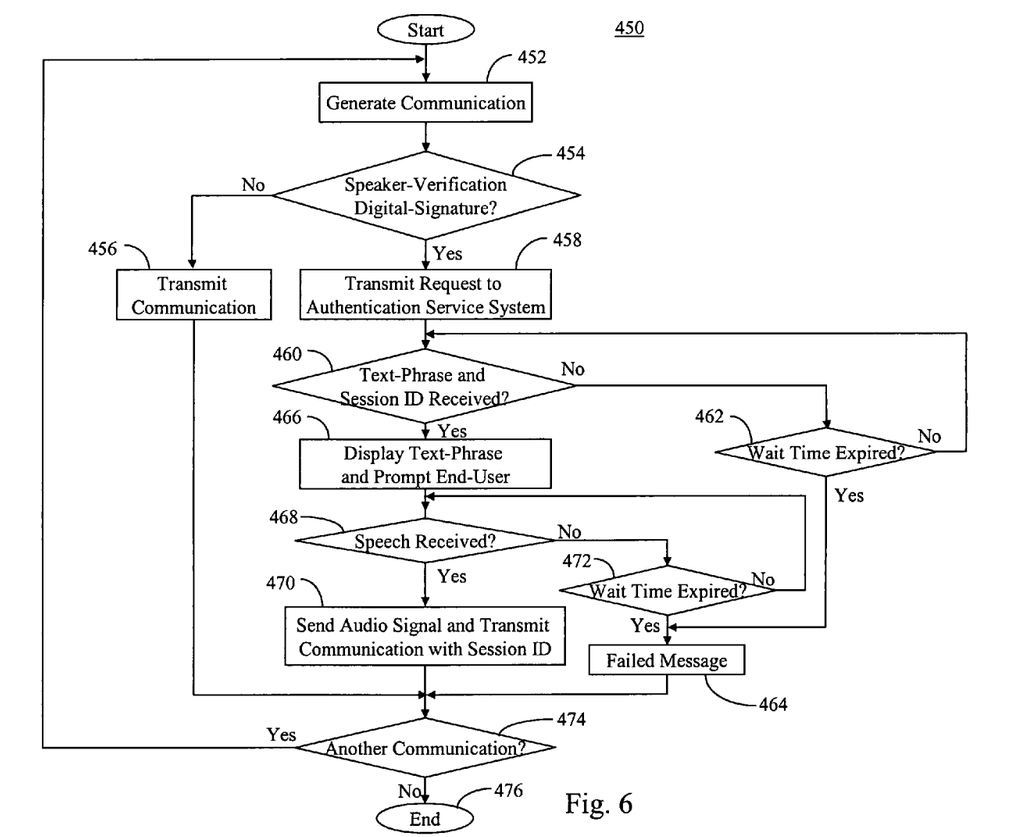
FIG. 6 shows a flow chart of an exemplary end-user system process for requesting speaker-verification digital signatures.

FIG. 6 shows a flowchart 450 of an end-user system process for requesting a speaker-verification digital signature. In step 452, the process generates a communication based on end-user inputs and goes to step 454. In step 454, the process determines whether the end-user desires to generate a speaker-verification digital signature. If a speaker-verification digital signature is desired, the process goes to step 458; otherwise, the process goes to step 456. In step 456, the process transmits the communication to communication recipients indicated in the communication and goes to step 474.

In step 458, the process transmits a speaker-verification digital signature request to an authentication service system and goes to step 460. In step 460, the process determines whether a text-phrase and a session ID has been received. If the text-phrase and session ID has been received, the process goes to step 466; otherwise, the process goes to step 462. In step 462, the process determines whether a wait-time for receiving the text-phrase has expired. If the wait time has expired, the process goes to step 464; otherwise, the process returns to step 460. In step 464, the process generates a failure message indicating that the request for speaker-verification digital signature has failed and goes to step 474.

In step 466, the process displays the received text-phrase and prompts the end-user to speak the text-phrase and goes to step 468. In step 468, the process determines whether the end-user speech has been received. If the end-user speech has been received, the process goes to step 470; otherwise, the process goes to step 472. In step 472, the process determines whether a wait time for receiving the end-user speech has expired. If the wait time has expired, the process goes to step 464; otherwise, the process returns to step 468. In step 470, the process sends the audio signal to the authentication service system, adds the session ID to the communication, transmits the communication having the session ID, and goes to step 474. In step 474, the process determines whether the end-user desires to prepare another communication. If another communication is desired, the process returns to step 452; otherwise, the process goes to step 476 and ends.

Figure 7:
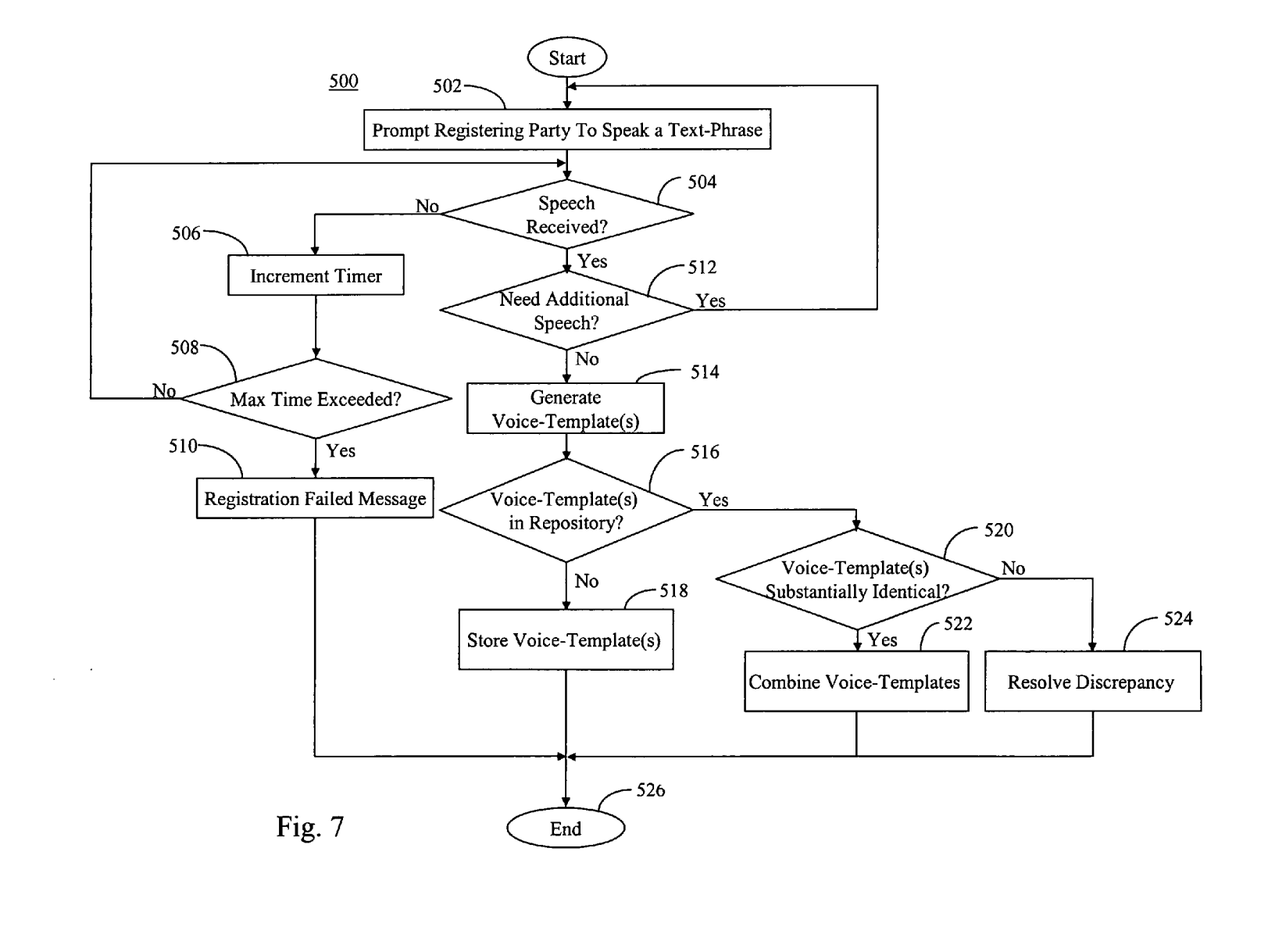
FIG. 7 shows a flow chart of an exemplary registration process of authentication service system.

FIG. 7 shows a flowchart 500 of a process for registering a party's voice-template. In step 502, the process prompts a registering party to speak a text-phrase and goes to step 504. In step 504, the process determines whether an audio signal has been received from the registering party. If the audio signal has been received, the process goes to step 512; otherwise, the process goes to step 506. In step 506, the process increments a timer and goes to step 508. In step 508, the process determines whether a maximum time has been exceeded. If a maximum time has been exceeded, the process goes to step 510; otherwise, the process returns to step 504. In step 510, the process outputs a message indicating that the registration process has failed and goes to step 526 and ends.

In step 512, the process determines whether additional speech input from the registering party is needed. If additional speech input is needed, the process returns to step 502; otherwise, the process goes to step 514. In step 514, the process generates one or more voice-templates and goes to step 516. In step 516, the process determines whether voice-templates for the identified registering party are already stored in the repository. If voice-templates are in the repository, the process goes to step 520; otherwise, the process goes to step 518. In step 518, the process stores the voice-template in the repository and goes to step 526.

In step 520, the process determines whether the new voice-template is substantially identical with the voice-template already in the repository. If substantially identical, the process goes to step 522; otherwise, the process goes to step 524. In step 522, the process resolves the two sets of voice-templates by combining the voice-templates, and storing the combined template in the repository and goes to step 526. In step 524, the process may resolve the apparent discrepancy by storing the latest voice template in the repository, for example, and goes to step 526.

When an end-user selects an email for viewing, end-user system 104-110 may first determine whether the selected email includes a session ID. If a session ID is found, end-user system 104-110 may search for received authentication information that includes the same session ID. If the authentication information is found, end-user system 104-110 may display the email and the authentication information to the end-user. If the authentication information for the same session ID is not found, end-user system 104-110 may wait for a preset amount of time, for example, to permit the authentication information sent by authentication service system 112 to arrive. If the authentication information is not received after the preset time has expired, end-user system 104-110 may display the email with an indication that expected authentication information has not been received.

Figure 8:
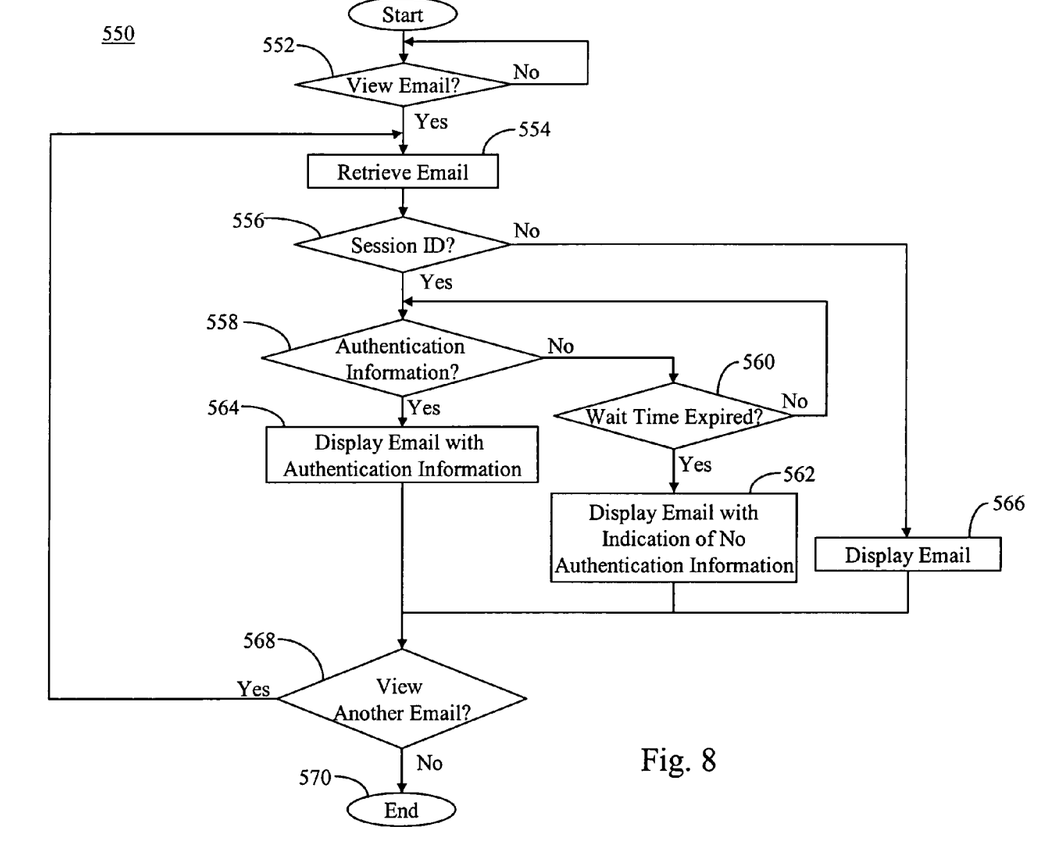
FIG. 8 shows a flow chart of an exemplary end-user system process for receiving a communication having a speaker-verification digital signature.

FIG. 8 shows a flow chart 550 of an exemplary end-user system process for receiving email that was signed with a speaker-verification digital signature. In step 552, the process determines if an end-user desires to view email. If the end-user desires to view email, the process goes to step 554; otherwise the process returns to step 552. In step 554, the process retrieves a selected email and goes to step 556. In step 556, the process determines whether the retrieved email includes a session ID indicating that the email has been signed with a speaker-verification digital signature. If the email includes a session ID, the process goes to step 558; otherwise the process goes to step 566. In step 566, the process displays the retrieved email and goes to step 568.

In step 558, the process determines whether authentication information that includes the same session ID as the selected email has been received. If the authentication information has been received, the process goes to step 564; otherwise, the process goes to step 560. In step 560, the process determines whether a preset wait time has expired. The wait time allows authentication service system 112 and network 102 adequate time to transmit the authentication information. If the wait time has expired, the process goes to step 562; otherwise, the process returns to step 558. In step 562, the process displays the selected email with an indication that the email was signed with a speaker-verification digital signature, but the authentication information has not been received, and the process goes to step 568. In step 568, the process determines whether the end-user selected another email. If another email is selected, the process returns to step 554; otherwise, the process goes to step 570 and ends.

While the invention has been described in conjunction with exemplary embodiments, these embodiments should be viewed as illustrative, not limiting. Various modifications, substitutes or the like are possible within the spirit and scope of the invention.

What is claimed is:

1. A method comprising:
  receiving a first request from a first end-user system for a speaker-verification digital signature for a corresponding communication;
  authenticating, via a processor, a claimed identity associated with a sender of the corresponding communication, the authenticating comprising obtaining an audio signal from the first end-user system corresponding to a text-phrase provided at the first end-user system and a voice template that corresponds to the claimed identity, comparing the audio signal and voice template to generate a confidence score, and generating an authentication certificate when the confidence score exceeds a threshold;

after authenticating the claimed identity, generating a session ID to be inserted in the corresponding communication, the session ID being unique with respect to other communications for a destination address of the corresponding communication, and the session ID being available for use as another session ID for a different destination address; and responsive to generating the session ID, separately transmitting the corresponding communication and authentication information having the session ID to the destination address indicated in the corresponding communication, wherein the authentication information is generated by packaging the session ID with the authentication certificate if the confidence score exceeded the threshold, else the authentication information is generated by packaging the session ID with the confidence score.

2. The method of claim 1, the authenticating further comprising:
generating a text-phrase; and
transmitting the text-phrase to the first end-user system.

3. The method of claim 1, wherein comparing the audio signal and voice template further comprises:
performing speech recognition on the audio signal to extract spoken words;
generating a first confidence score by comparing the spoken words against the text-phrase;
extracting features from the audio signal;
generating a second confidence score by comparing the features against the voice-template; and
combining the first confidence score with the second confidence score to generate the confidence score.

4. The method of claim 1, further comprising:
receiving a second request from a second end-user system for registration;
generating a second text-phrase;
transmitting the second text-phrase to the second end-user system; and
receiving a second audio signal from the second end-user system that corresponds to the second text-phrase.

5. The method of claim 4, further comprising:
generating a second voice-template based on the second audio signal; and
saving the second voice-template indexed based on an identity indicated in the second request.

6. The method of claim 4, further comprising:
performing speech recognition on the second audio signal to extract spoken words that correspond to the second text-phrase;
comparing the spoken words against the second text-phrase to generate a first confidence score;
extracting features from the second audio signal;
comparing the features against the voice-template to generate a second confidence score; and
saving the voice-template indexed based on an identity indicated in the second request if the first confidence score and the second confidence score exceed a threshold.

7. The method of claim 1, further comprising:
receiving in a third end-user system an authenticated communication;
searching for an authentication information having a second session ID that corresponds to a first session ID included in the authenticated communication; and displaying the authenticated communication and the authentication information when an end-user selects the authenticated communication for display.

8. The method of claim 1, wherein the corresponding communication comprises at least one of:
an email, a facsimile, a document transfer, and a text instant message session; and
the session ID being further unique with respect to at least one of: the corresponding communication, the first end-user system, and the claimed identity.

9. A non-transitory machine-readable storage medium having stored therein instructions which, when executed by a computing device, cause the computing device to perform a method comprising:
receiving a first request from a first end-user system for a speaker-verification digital signature for a corresponding communication;
authenticating a claimed identity associated with a sender of the corresponding communication, the authenticating comprising obtaining an audio signal from the first end-user system corresponding to a text-phrase provided at the first end-user system and a voice template that corresponds to the claimed identity, comparing the audio signal and voice template to generate a confidence score, and generating an authentication certificate when the confidence score exceeds a threshold;
after authenticating the claimed identity, generating a session ID to be inserted in the corresponding communication, the session ID being unique with respect to other communications for a destination address of the corresponding communication, and the session ID being available for use as another session ID for a different destination address; and
responsive to generating the session ID, separately transmitting the corresponding communication and authentication information having the session ID to the destination address indicated in the corresponding communication,
wherein the authentication information is generated by packaging the session ID with the authentication certificate if the confidence score exceeded the threshold, else the authentication information is generated by packaging the session ID with the confidence score.

10. The non-transitory machine-readable storage medium of claim 9, the instructions, when executed by the computing device, cause the computing device to perform a method further comprising:
generating a text-phrase; and
transmitting the text-phrase to the first end-user system.

11. The non-transitory machine-readable storage medium of claim 9, wherein comparing the audio signal and voice template further comprises:
performing speech recognition on the audio signal to extract spoken words;
generating a first confidence score by comparing the spoken words against the text-phrase;
extracting features from the audio signal;
generating a second confidence score by comparing the features against the voice-template; and
combining the first and second confidence scores to generate the confidence score.

12. The non-transitory machine-readable storage medium of claim 9, the instructions further comprising:
receiving a second request from a second end-user system for registration;
generating a second text-phrase;

transmitting the second text-phrase to the second end-user system; and receiving a second audio signal from the second end-user system that corresponds to the second text-phrase.

13. The non-transitory machine-readable storage medium of claim 12, the instructions, when executed by the computing device, cause the computing device to perform a method further comprising:

generating a second voice-template based on the second audio signal; and saving the second voice-template indexed based on an identity indicated in the second request.

14. The non-transitory machine-readable storage medium of claim 12, the instructions, when executed by the computing device, cause the computing device to perform a method further comprising:

performing speech recognition on the second audio signal to extract spoken words that correspond to the second text-phrase;

comparing the spoken words against the second text-phrase to generate a first confidence score;

extracting features from the second audio signal;

comparing the features against the text-phrase to generate a second confidence score; and saving the text-phrase indexed based on an identity indicated in the second request if the first and second confidence scores exceed a threshold.

15. The non-transitory machine-readable storage medium of claim 9, the instructions, when executed by the computing device, cause the computing device to perform a method further comprising:

receiving in a third end-user system an authenticated communication;

searching for an authentication information having a second session ID that corresponds to a first session ID included in the authenticated communication; and displaying the authenticated communication and the authentication information when an end-user selects the authenticated communication for display.

16. A system comprising:

a processor; and a computer-readable storage medium storing instructions which, when executed by the processor, cause the processor to perform a method comprising:

receiving a request for a speaker-verification digital signature of a corresponding communication;

authenticating an identity claimed in the corresponding communication based on speaker-verification, the identity being associated with a sender of the corresponding communication, the authenticating comprising obtaining an audio signal from the first end-user system corresponding to a text-phrase provided at the first end-user system and a voice template that corresponds to the identity, comparing the audio signal and voice template to generate a confidence score, and generating an authentication certificate when the confidence score exceeds a threshold;

after authenticating the identity, generating a session ID to be inserted in the corresponding communication, the session ID being unique with respect to other communications for a destination address of the corresponding communication, and the session ID being available for use as another session ID for a different destination address; and separately transmitting the corresponding information and authentication information having the session ID to the destination address indicated in the corresponding communication responsive to generating the session ID, wherein the authentication information is generated by packaging the session ID with the authentication certificate if the confidence score exceeded the threshold, else the authentication information is generated by packaging the session ID with the confidence score.

* * * * *